United States Patent [19]

Flannery et al.

[11] 4,111,708

[45] Sep. 5, 1978

[54] MACHINABLE GLASSES

[75] Inventors: James E. Flannery; Dale R. Wexell, both of Corning, N.Y.

[73] Assignee: Corning Glass Works, Corning, N.Y.

[21] Appl. No.: 867,222

[22] Filed: Jan. 6, 1978

[51] Int. Cl.$^2$ .............................. C03C 3/10; C03C 3/8; C03C 3/22

[52] U.S. Cl. .................................... 106/53; 106/39.6; 106/39.7; 106/39.8; 106/54

[58] Field of Search ....................... 106/53, 39.6, 39.7, 106/39.8

[56] References Cited

U.S. PATENT DOCUMENTS

| | | | |
|---|---|---|---|
| 3,369,961 | 2/1968 | Dalton et al. | 106/53 |
| 3,503,763 | 3/1970 | Mills | 106/53 |
| 4,038,448 | 7/1977 | Boyd et al. | 106/53 |

Primary Examiner—O. R. Vertiz
Assistant Examiner—Mark Bell
Attorney, Agent, or Firm—Clinton S. Janes, Jr.

[57] ABSTRACT

The present invention relates to glass articles which have compositions within the $Li_2O$-$ZnO$-$PbO$-$B_2O_3$-$SiO_2$-$TiO_2$-$Al_2O_3$ system, which exhibit a dense white opal appearance, and which have good machinability characteristics. The latter property enables the articles to be sawed and drilled with hand tools without spalling or breakage and, in addition, to be polished to a relatively high gloss. The glasses are rendered opaque by their spearation into a lead oxide rich phase and a $B_2O_3$-$SiO_2$ rich phase. The glasses may be converted to glass-ceramic materials, either before or after machining, if desired.

3 Claims, No Drawings

MACHINABLE GLASSES

BACKGROUND OF THE INVENTION

Traditionally, vitreous materials have been characterized as being brittle and having a tendency to shatter into sharp pieces or shards on breakage. Consequently, these materials have not been amenable to machining processes, as are metals, but have been molded either in a thermally softened state or as a comminuted powder.

Approximately twenty years ago, glass-ceramics, that is, ceramic-like materials produced by controlled crystallization of certain glasses, were announced. Like the glasses that they are produced from, these new glass-ceramic materials tend to be brittle and to shatter when subjected to normal machining processes.

It was surprising indeed when it was discovered recently that certain glass-ceramics were capable of being machined. While these machinable materials have achieved technical success, and are used in many special applications, their cost is a limiting factor on broader acceptance. It would, then, be particularly desirable to provide machinable glasses and/or glass-ceramics at a lower cost, and this is a basic purpose of the present invention.

PRIOR ART

U.S. Pat. No. 2,920,971, granted Jan. 12, 1960 to S. D. Stookey, the basic patent in the field of glass-ceramics, teaches the general effectiveness of $TiO_2$ as a nucleating agent for the conversion of glass materials to glass-ceramics. This patent is incorporated herein by reference for its general teaching with respect to the nature and production of glass-ceramic materials. However, there is no mention in the patent of machinable materials, nor are there any compositions or composition systems shown that are generally close to the compositions of the present invention.

The initial disclosure of machinable glass-ceramics is believed to be U.S. Pat. No. 3,689,293, granted Sept. 5, 1972 to G. H. Beall. That patent discloses fluorine mica materials in the $SiO_2$-$B_2O_3$-$Al_2O_3$-MgO-$K_2O$-F composition system that contain crystals related to the natural mineral phlogopite. Other U.S. patents disclosing machinable glass-ceramic materials include: U.S. Pat. Nos. 3,756,838, 3,732,087, 3,801,295, and 3,997,352. Each of these patents discloses a composition field for a mica-type glass-ceramic material.

U.S. Pat. No. 3,503,763, granted Mar. 31, 1970 to W. H. Mills, describes devitrifying solder glasses composed essentially of 4–6% $Li_2O$, 13–23% PbO, 4–11% $B_2O_3$, 14–19% $Al_2O_3$, and 39–50% $SiO_2$, with $TiO_2$ and ZnO being among the optional ingredients which may be present in small amounts. However, no mention is made of machinability, and the crystal phases that develop are beta-spodumene or betaeucryptite.

There are glass composition disclosures wherein the essential ingredients include a majority of the oxides $Li_2O$, ZnO, PbO, $B_2O_3$, $TiO_2$, $SiO_2$, and $Al_2O_3$, and wherein the remaining oxides may be present as optional ingredients. However, these glasses are generally disclosed as useful for such purposes as ophthalmic ware, electrical and electronic components, and opal dinnerware. There is no reference to machinability, and applicant is unaware that any of the specifically disclosed glasses is capable of being machined.

One such glass disclosure is in United Kingdom Specification No. 1,181,430. This patent is directed to PbO-$TiO_2$-$B_2O_3$-$SiO_2$ ultrasonic delay line glasses wherein $Li_2O$ is an optional alkali metal oxide and a minor amount of ZnO may also be present.

Other examples include U.S. Pats. No. 2,523,264 and No. 2,523,266, granted Sept. 26, 1950 to W. H. Armistead. These patents disclose ophthalmic glasses which are in the $Li_2O$-$ZrO_2$-$B_2O_3$-$SiO_2$ composition field, which contain two or more bivalent oxides one of which may be PbO, and which may optionally contain ZnO and/or $TiO_2$. U.S. Pat. No. 2,570,020, granted Oct. 2, 1951 to the same inventor, discloses electrical bulb glasses in the same composition field. There is, of course, no suggestion of machinability in any of these patents, and the proportions of the individual oxides are quite different from those characterizing the present glasses.

Borosilicate opal glasses, which may contain ZnO, $Li_2O$ and/or $TiO_2$, but which contain no mention of PbO, are disclosed in U.S. Pats. No. 3,275,492, granted Sept. 27, 1966 to J. L. Herbert, No. 3,723,144, granted Mar. 27, 1973 to J. E. Flannery et al., and No. 3,728,139, granted Apr. 17, 1973 to G. B. Carrier et al.

SUMMARY OF THE INVENTION

We have discovered that glasses within a select composition field of the $Li_2O$-ZnO-PbO-$B_2O_3$-$SiO_2$-$TiO_2$-$Al_2O_3$ system exhibit such machinability, in the glass state, that they may be sawed and drilled with hand tools. We have further found that these glasses may be converted to corresponding glass-ceramic materials by subjecting the glasses to the usual nucleation and crystallization steps. Quite surprisingly, the glass-ceramic materials are also machinable to some extent, but considerably less so than the unceramed (uncrystallized) glass.

The composition ranges for glasses in accordance with the present invention consist essentially, as calculated in weight percent on the oxide basis from the glass batch, of 0.3–2.5% $Li_2O$, 1–10% ZnO, 5–28% PbO, 4–12% $B_2O_3$, 45–72% $SiO_2$, 0–5% $TiO_2$ and 0–7% $Al_2O_3$. In general, oxides other than those named above should be omitted, although minor amounts of such oxides as the alkali metal or alkaline earth metal oxides may be tolerated in an amount not exceeding about 3%.

GENERAL DESCRIPTION OF THE INVENTION

The glasses of the invention are phase separable glasses. Thus, the homogeneous, single-phase glass produced by melting is separated by subsequent heat treatment into a two-phase glass wherein one phase is dispersed in the other in the nature of an emulsion.

The lead oxide (PbO) content in the present glasses tends to concentrate in one phase to produce a soft, or low viscosity, lead-rich phase. The other phase is rich in boric oxide and silica, although, to some extent, each of these oxides is present in the lead-rich phase as well.

It is our belief that the machinability of the present glasses results from a substantial difference between the viscosity values for the two glass phases at any given temperature. Thus, we hypothesize that the lead-rich phase is much softer, than is, it has a much lower viscosity at any given temperature, than does the borosilicate phase. Further, this situation enables the lead-rich phase to flow relative to the borosilicate phase under stress, thereby tending to relieve stresses set up during machining operations.

The two phases also have markedly different indices of refraction, thus rendering the glass a dense white opal as the phases separate. Lead containing crystals, such as $PbZnSiO_4$, $Pb_2SiO_4$ and $PbO.B_2O_3$, also generally form in the glass in amounts less than 10% by volume. However, the presence of these crystals is not believed to contribute to the machinability of the glass. Rather, it is believed that they tend to impair this property since they deplete the lead-rich phase. Further, glass-ceramic materials, wherein these crystal phases are further developed, do not normally machine as well as do their glass precursors.

In general, the present glasses may be quenched from the melt to form essentially clear, single phase glasses. When so quenched, they may then be phase separated by a subsequent heat treatment equivalent to heating at 550°-700° C. for 4-8 hours. We find that the normal annealing schedule for these glasses is the equivalent of such heat treatment, and will usually result in phase separation. Obviously, in the event that phase separation is inadequate, as may be the case in either low lead content or low $B_2O_3$ content glasses, the annealing cycle may be lengthened, or other supplemental treatment applied, to provide a desired degree of phase separation.

The basic glass forming oxides in our glasses are silica and boric oxide. On phase separation, these oxides tend to concentrate in a harder, or higher viscosity, phase. Below about 4% boric oxide, the glasses do not separate adequately to provide a useful degree of machinability. The solubility limit of boric oxide in the present glass system appears to be about 12%, and amounts of this oxide in excess of that value tend to produce severe devitrification tendencies on cooling of the melt.

Lead oxide is another key ingredient in our glasses since it is a major contributor to the soft, low viscosity, phase. At least 5% of this oxide is required for adequate separation for machinability purposes. With a content of lead oxide over about 28%, boric oxide tends to become insoluble in the present glasses so that the glass is difficult to melt. Also, a glass with such high lead oxide content tends to be too soft for machining purposes.

Lithia ($Li_2O$) is a further key ingredient. However, its role is more one of facilitating the separation of the phases, rather than contributing substantially to the composition or properties of either phase. Thus, it is believed that lithia tends to lower the surface tension in one or both phases in the glass to a much greater extent than do other more commonly used fluxes. Consequently, the usual alkali metal oxide fluxes, $Na_2O$ and $K_2O$, are avoided in the present glasses, except in minor amounts, as are the divalent oxides other than lead and zinc oxides. At least 0.3% $Li_2O$ is necessary for glass fluxing purposes. Over about 2.5%, however, tends to cause an undue amount of crystallization as the glass cools, thus impairing machinability.

The presence of zinc oxide, unlike other divalent metal oxides, appears to encourage the tendency of the glasses to phases separate. Accordingly, at least a small amount of this oxide is highly desirable, but amounts greater than about 10% tend to produce clear glasses that are not machinable.

A small amount of alumina, while not essential, improves machinability, and about 2-5% appears optimum. Large amounts tend to stabilize the glass against separation, thus impairing machinability, and also make melting difficult. Hence the maximum alumina content is about 7%.

Titania ($TiO_2$) plays its normal role of nucleant for crystal formation, and is necessary for conversion of the glasses to the glass-ceramic state if that is desired. At least 1% is desired for this purpose.

DESCRIPTION OF PREFERRED EMBODIMENTS

Table I recites glass compositions, expressed in terms of parts by weight on the oxide base, which are operable in the instant invention. Since the sum of the individual components is or closely approximates 100, the compositions can essentially be considered as being reported in weight percent. Ingredients for corresponding glass batches may comprise any materials, either the oxides or other compounds, which, upon being melted together, will be converted into the desired oxides in the proper proportions.

TABLE I

|  | 1 | 2 | 3 | 4 |
|---|---|---|---|---|
| $SiO_2$ | 52.2 | 55.9 | 60.2 | 58.6 |
| $B_2O_3$ | 9.3 | 9.2 | 9.5 | 9.5 |
| $Al_2O_3$ | 4.1 | 5.6 | — | 4.2 |
| $TiO_2$ | 3.2 | 3.1 | 3.2 | 3.3 |
| $Li_2O$ | 1.2 | 0.4 | 0.4 | 1.2 |
| PbO | 24.5 | 20.4 | 21.1 | 21.1 |
| ZnO | 5.5 | 5.4 | 5.6 | 2.2 |

|  | 5 | 6 | 7 | 8 | 9 |
|---|---|---|---|---|---|
| $SiO_2$ | 67.8 | 58.7 | 65.8 | 67.0 | 71.1 |
| $B_2O_3$ | 5.8 | 9.4 | 5.8 | 10.5 | 10.8 |
| $Al_2O_3$ | — | 4.1 | — | 4.7 | — |
| $TiO_2$ | 3.3 | 1.1 | 1.1 | 3.6 | 3.7 |
| $Li_2O$ | 1.3 | 0.4 | 0.4 | 1.4 | 1.4 |
| PbO | 19.6 | 20.8 | 21.3 | 6.8 | 6.9 |
| ZnO | 2.2 | 5.5 | 5.6 | 6.0 | 6.1 |

Glass batches corresponding to the compositions of Table I were compounded, ballmilled together to insure thorough mixing, and then placed in platinum crucibles. The crucibles were convered, positioned within a furnace operating at about 1550°-1650° C., and the batches melted for about 4 hours without stirring. Thereafter, the melts were poured into steel molds to yield glass slabs about 6" × 6" × ½", and the slabs were immediately transferred to an annealer operating at about 550°-700° C. When a melt was relatively fluid no fining agent was added to the batch, but LiCl was often included as a fining agent in the more viscous glasses. However, about 2-3% by weight of ammonium nitrate was added to the batch to insure against reduction of lead or titanium oxides in the melt. In large commercial melting practice, a fining agent such as $As_2O_3$ may be added, if necessary, without deleteriously affecting the quality of the glass articles.

Table II records a visual description of the glassy articles, as well as property data determined on the glasses. The latter includes the coefficient of thermal expansion over the range of 25°-300° C. ($\times 10^{-7}$/° C.), the modulus of rupture (psi), as determined in accordance with conventional measuring techniques, and a qualitative comparative measure of machinability based on behavior when subjected to hack saws and steel drills. On the machinability index employed here, the indices of cold rolled steel, aluminum, and brass are 78, 32, and 15, respectively.

TABLE II

| Example | Visual Description | Machinability | Thermal Expansion ($\times 10^{-7}$/° C) | Modulus of Rupture (psi) |
|---|---|---|---|---|
| 1 | dense white, cherty fracture | 30 | 39.4 | 10,180 |
| 2 | dense white, semigloss fracture | 15 | 36.4 | 11,000 |
| 3 | dense white, glossy fracture | 5 | 33.5 | — |

TABLE II-continued

| Example | Visual Description | Machinability | Thermal Expansion ($\times 10^{-7}/°C$) | Modulus of Rupture (psi) |
|---|---|---|---|---|
| 4 | dense white, cherty fracture | 20 | 37.1 | 10,120 |
| 5 | dense white, glossy fracture | 5 | 33.5 | — |
| 6 | dense white, semiglossy fracture | 20 | 34.4 | 9,940 |
| 7 | dense white, glossy fracture | 10 | 30.0 | 6,180 |
| 8 | dense white, cherty fracture | 30 | 33.8 | 9,800 |
| 9 | dense white, cherty fracture | 5 | 32.9 | — |

Table III sets forth, in a manner corresponding to that of Table I, a series of glass compositions selected from the same family as the glasses of the present invention, but wherein one ingredient is outside the limits prescribed for that ingredient. Glass batches based on these compositions were mixed, melted and cast as described above. In addition to the compositions, the Table sets forth measured data and descriptions of visual appearance for comparison purposes.

TABLE III

| Wt. % | 10 | 11 | 12 | 13 | 14 | 15 | 16 | 17 | 18 | 19 |
|---|---|---|---|---|---|---|---|---|---|---|
| $SiO_2$ | 56.3 | 52.5 | 50.4 | 55.3 | 48.5 | 70.0 | 56.2 | 50.5 | 50.4 | 49.7 |
| $B_2O_3$ | 9.3 | 8.3 | 9.3 | 9.3 | 8.0 | 11.3 | 2.0 | 15.0 | 8.0 | 9.3 |
| $Al_2O_3$ | 5.1 | 4.5 | 4.1 | 4.1 | 4.5 | 5.4 | 4.7 | 4.5 | 9.0 | 4.5 |
| $TiO_2$ | 3.5 | 3.2 | 8.0 | 0 | 3.5 | 4.3 | 3.6 | 3.5 | 3.0 | 3.5 |
| $Li_2O$ | 1.2 | 1.0 | 1.2 | 1.2 | 1.0 | 1.6 | 1.5 | 1.5 | 1.6 | 3.5 |
| ZnO | — | 12.0 | 5.5 | 5.5 | 4.5 | 7.4 | 7.0 | 5.0 | 5.5 | 5.5 |
| PbO | 24.5 | 18.5 | 21.5 | 24.5 | 30.0 | — | 25.0 | 20.0 | 22.5 | 24.0 |
| S.P. (°C): | 820 | 760 | — | 705 | 696 | Shrinks | 752 | Surface Devit. | 785 | 690 |
| Exp.: ($\times 10^{-7}$/°C) | 44.5 | 38.6 | — | 40.5 | 40.2 | — | — | — | — | 48.1 |
| Appearance: | Clear, glossy | Slight opal; glossy fracture | Dense opal; cherty fracture; stone | Med. opal; cherty fracture | Clear; opal; streaks; glossy fracture | Clear; much stone | Clear; $PbSiO_4$ stone | Dense opal; | Med. opal; cherty fracture | Dense opal; glossy fracture |
| Machinability Index | | 2 | 2 | 10 | — | — | — | — | 2 | 10 |

Examples 10 and 11 respectively illustrate the effects of low and high contents of zinc oxide, in each case the glass tending to be a clear glass with little or no machining capability. Example 12 illustrates the effect of excess titania. This situation is believed to result in incomplete melting and to cause an undue amount of crystallization which reduces machinability and prevents property measurement. Example 13 illustrates that the presence of titania, while useful, is not essential.

Examples 14 and 15 illustrate the effects of failing to control the lead oxide content. Thus, a clear glass results in either case, but the absence of lead also makes the glass very difficult to melt at normal temperatures. Example 16 illustrates the need for at least 4% boric oxide to effect phase separation. Example 17, on the other hand shows that exceeding the solubility limit of $B_2O_3$ may produce an unusable glass despite development of dense opacity.

Example 18 illustrates the undesirability of excess alumina. The glass produced from Example 19 was interesting. As indicated, it exhibited a fair degree of machinability. However, upon standing, it spontaneously disintegrated. This suggests chemical instability of some nature.

We claim:

1. A phase separated, machinable glass having a composition which, as calculated in weight percent on the oxide basis from the glass batch, consists essentially of 0.3–2.5% $Li_2O$, 1–10% ZnO, 5–28% PbO, 4–12% $B_2O_3$, 45–72% $SiO_2$, 0–5% $TiO_2$ and 0–7% $Al_2O_3$.

2. A glass according to claim 1 containing 2–5% $Al_2O_3$.

3. A glass according to claim 1 containing 1–5% $TiO_2$.

* * * * *